United States Patent [19]

Okada

[11] Patent Number: 5,255,101
[45] Date of Patent: Oct. 19, 1993

[54] APPARATUS FOR RECORDING VIDEO SIGNAL THROUGH FREQUENCY MODULATION WITH VARIABLE CLIPPING LEVEL

[75] Inventor: Shunji Okada, Kanagawa, Japan
[73] Assignee: Sony Corporation, Tokyo, Japan
[21] Appl. No.: 688,475
[22] Filed: Apr. 22, 1991
[30] Foreign Application Priority Data
  Apr. 24, 1990 [JP] Japan .................................. 2-108076
[51] Int. Cl.⁵ ............................................ H04N 5/91
[52] U.S. Cl. ..................................... 358/340; 358/330
[58] Field of Search ............... 358/340, 330, 327, 336, 358/310, 335, 167, 170; 360/65, 66; 369/88, 48, 49, 133, 134

[56] References Cited

U.S. PATENT DOCUMENTS

| | | | |
|---|---|---|---|
| 4,481,547 | 11/1984 | Sato | 360/33.1 |
| 4,597,021 | 1/1986 | Yamamitsu et al. | 360/33.1 |
| 4,860,105 | 8/1989 | Sakaguchi et al. | 358/167 |
| 4,979,043 | 12/1990 | Suzuki et al. | 358/167 |

Primary Examiner—Tommy Chin
Assistant Examiner—Robert Chevalier
Attorney, Agent, or Firm—Hill, Steadman & Simpson

[57] ABSTRACT

A video signal recording apparatus, typically a high-band 8-mm, (Hi 8) video tape recorder, records a video signal through frequency modulation on a magnetic tape. The video signal recording apparatus has a preemphasizing circuit for preemphasizing a video signal, a clipping circuit for clipping the preemphasized video signal at a clipping level, and a frequency modulator for frequency-modulating the clipped video signal. The clipping circuit comprises a white clipping circuit for applying a plurality of selectable clipping voltages corresponding to different white clipping levels, respectively, and a dark clipping circuit for applying a plurality of selectable clipping voltages corresponding to different dark clipping levels, respectively. The clipping levels are selected depending on the type of the magnetic tape, e.g., whether it is an evaporated tape or a metal tape.

2 Claims, 3 Drawing Sheets

APPARATUS FOR RECORDING VIDEO SIGNAL THROUGH FREQUENCY MODULATION WITH VARIABLE CLIPPING LEVEL

BACKGROUND OF THE INVENTION

1. Field of the Invention

The present invention relates to an apparatus for recording a video signal through frequency modulation on a recording medium such as a magnetic tape.

2. Description of the Prior Art

In video tape recorders, particularly color video tape recorders, it is customary for better signal-to-noise ratio of reproduced video signals to preemphasize a luminance signal of a composite color video signal, i.e., emphasize high frequency components of the luminance signal, then frequency-modulate the preemphasized luminance signal, and record the frequency-modulated luminance signal on a magnetic tape. When the recorded luminance signal is reproduced, it is frequency-demodulated and then deemphasized into a luminance signal with the original frequency characteristics.

When a luminance signal is preemphasized, an abrupt transient from a low level portion to a high level portion of the luminance signal turns into a spike (white spike) which is responsible for a picture image reversal or a poor signal-to-noise ratio. In order to avoid such a drawback, it has been proposed to clip spikes caused by high and low level portions of a preemphasized luminance signal before the preemphasized luminance signal is frequency-modulated as disclosed in Japanese Laid-Open Patent Publication No. 59(1984)-208989.

Some conventional video tape recorders employ clipping circuits for removing spikes. The earlier clipping circuits have a constant clipping level for shearing off spikes of a preemphasized luminance signal irrespective of whether the signal is to be recorded on an evaporated tape or a metal tape.

The evaporated and metal tapes will briefly be described below.

The evaporated tape comprises a tape base on which there is deposited a thin film of magnetic metal (e.g., Co-Ni alloy) with no binder, by vacuum evaporation. The tape base and deposited film of magnetic metal of the obliquely evaporated tape are thinner than those of coated tapes, the tape base and deposited film of magnetic metal being typically 10 μm thick. Obliquely evaporated tape is obliquely magnetized, while metal powder coated tape is horizontally magnetized, which gives bigger demagnetization in recording short wave lengths. Therefore, the evaporated tape is suitable for high-density recording and is high in performance for recording in short wavelengths. The evaporated tape has high coercivity, a good squareness ratio, and improved self-demagnetization loss and thickness loss due to the oblique evaporated thin-film configuration. The residual magnetism of the evaporated tape is several times greater than that of the cobalt-ferric-oxide tape.

The metal tape comprises a tape base coated with fine particles (whose diameter is 1 μm or less) or a 100% crystal of a ferromagnetic metal such as iron, cobalt, nickel, or the like. The metal tape has a magnetic energy (i.e., the area defined by the hysteresis loop) which is four times that of the cobalt-ferric-oxide tape, and exhibits high performance for short-wavelength recording.

The evaporated and metal tapes have the following characteristics:

|  | Evaporated tape | Metal tape |
| --- | --- | --- |
| Saturated flux density (gauss) | 7,500 | 3,000 |
| Residual flux density (gauss) | 6,000 | 2,300 |
| Coercive force (Oe) | 800 | 1,300 |
| Magnetic layer thickness (μm) | 0.1 | 2.5 |
| Tape thickness (μm) | 10 | 17 |

FIGS. 1A and 1B show signal-to-noise ratios of frequency-modulated luminance signals which are reproduced from evaporated and metal tapes, respectively, while the tapes are running for long periods of time, with the preemphasized luminance signals being clipped with a constant clipping level regardless of the types of the tapes in a conventional video tape recorder, i.e., a high-band 8-mm (Hi 8) video tape recorder.

In each of FIGS. 1A and 1B, the horizontal axis represents time (hour) and the vertical axis the signal-to-noise ratio of a frequency-modulated luminance signal which is reproduced from a magnetic tape. The vertical axes of FIGS. 1A and 1B are of identical graduations indicated in the same units, although they are not shown.

FIG. 1A shows the signal-to-noise ratio of signal components in 7 MHz and 10 MHz of a frequency-modulated luminance signal which is reproduced from an evaporated tape, whereas FIG. 1B shows the signal-to-noise ratio of signal components in 7 MHz, 9 MHz, and 10 MHz of a frequency-modulated luminance signal which is reproduced from a metal tape.

A comparison between the characteristic curves shown in FIGS. 1A and 1B indicates that the signal-to-noise ratios (FIG. 1B) of the higher-frequency signal components of the frequency-modulated luminance signal reproduced from the metal tape drop to a greater extent with time than the signal-to-noise ratios (FIG. 1A) of the same higher-frequency signal components of the frequency-modulated luminance signal reproduced from the evaporated tape. This means that the signal-to-noise ratios are reduced with time for different reasons with respect to the evaporated and metal tapes.

More specifically, when an evaporated tape is held in sliding contact with the contact surface of a rotary magnetic head, the contact surface of the rotary magnetic head is worn by the evaporated tape, and therefore, the distance between the contact surface of the rotary magnetic head and the magnetic layer of the evaporated tape varies with time. Consequently, the signal-to-noise ratio of the frequency-modulated luminance signal which is reproduced from the evaporated tape by the rotary magnetic head is lowered with time.

When a metal tape is held in sliding contact with the contact surface of a rotary magnetic head, a thin film of fine ferromagnetic particles from the metal tape is deposited on the contact surface of the rotary magnetic head. For this reason, the signal-to-noise ratio of the frequency-modulated luminance signal which is reproduced from the metal tape by the rotary magnetic head is also lowered with time.

There has been proposed a data reproducing system in which audio data recorded on a magnetic tape by biphase pulse code modulation are reproduced by a magnetic head, and information data are demodulated from the reproduced audio data, the data reproducing system having an equalizer with different equalizing characteristics that are selectable depending on the type of the magnetic tape used, as disclosed in Japanese Laid-Open Patent Publication No. 63(1988)-96775.

The clipping circuits of the conventional color video tape recorders have a constant clipping level regardless of widely different carrier-to-noise ratios of the electromagnetic transducer with respect to frequency signal components of frequency-modulated luminance signals reproduced from different types of magnetic tapes. Thus, picture image reversal margins where white spikes are clipped cannot be optimized for all different types of magnetic tapes.

OBJECTS AND SUMMARY OF THE INVENTION

It is an object of the present invention to provide an apparatus for recording a video signal through frequency modulation on a recording medium after preemphasizing and clipping the video signal, the apparatus having means for varying a clipping level to optimize picture image reversal margins where white spikes are clipped, regardless of different types of recording mediums.

According to the present invention, there is provided an apparatus for recording a video signal through frequency modulation on a recording medium, comprising a preemphasizing circuit for preemphasizing the video signal, a clipping circuit for clipping the preemphasized video signal with a clipping level, the clipping circuit having means for varying the clipping level depending on the type of the recording medium, and a frequency modulator for frequency-modulating the clipped video signal.

The means comprises a white clipping circuit for applying a plurality of selectable clipping voltages corresponding to different white clipping levels, respectively, and also a dark clipping circuit for applying a plurality of selectable clipping voltages corresponding to different dark clipping levels, respectively.

The above and other objects, features, and advantages of the present invention will become apparent from the following detailed description of an illustrative embodiment thereof to be read in conjunction with the accompanying drawings, in which like reference numerals represent the same or similar objects.

DETAILED DESCRIPTION OF THE PREFERRED EMBODIMENT

Figure 2:
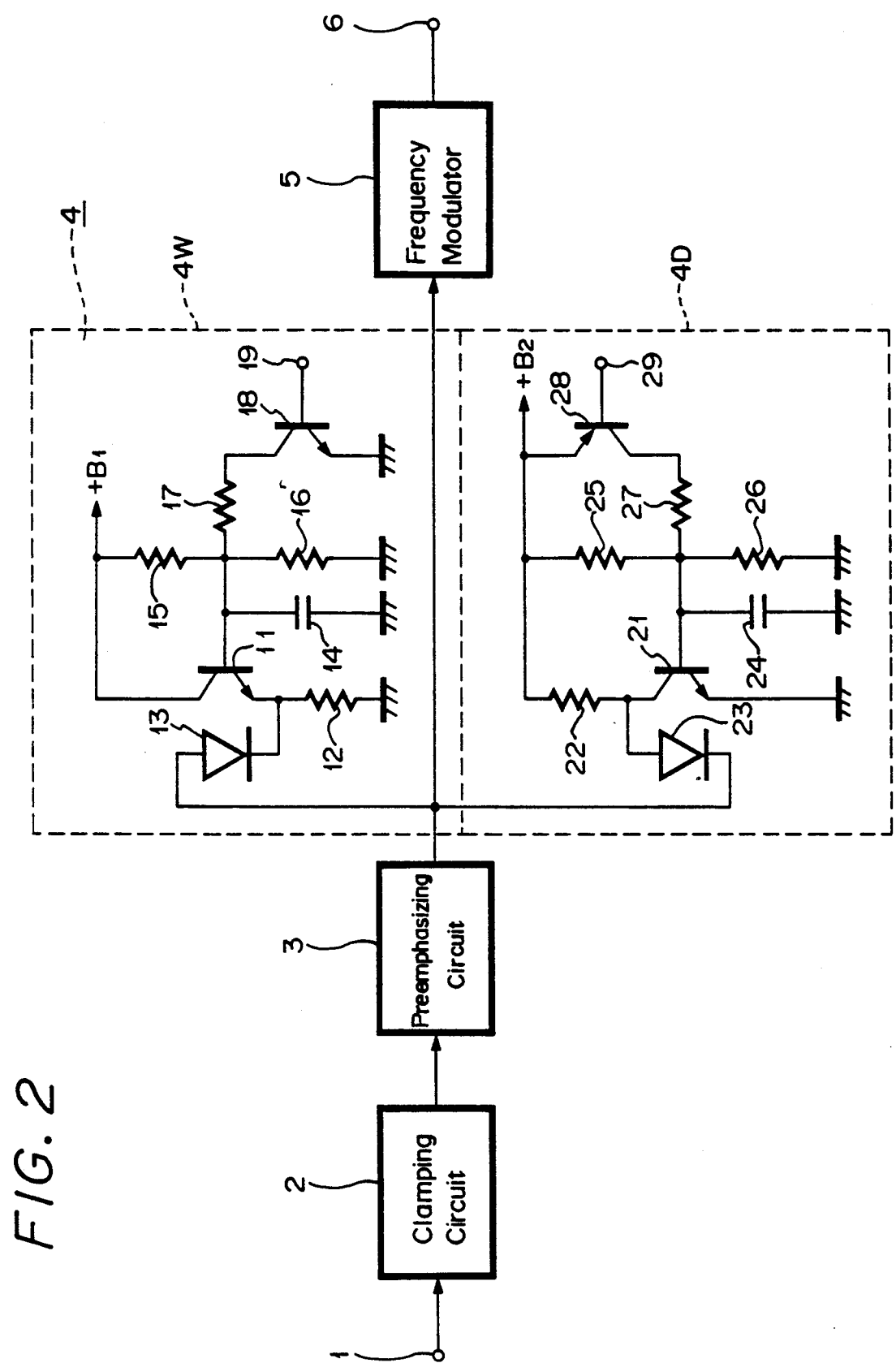
FIG. 2 is a circuit diagram, partly in block form, of a video signal recording apparatus according to the present invention.

FIG. 2 shows a video image recording apparatus according to the present invention, which is incorporated in a high-band 8-mm (Hi 8) video tape recorder in the illustrated embodiment.

A luminance signal of a composite video signal is supplied from an input terminal 1 to a clamping circuit 2 which clamps the luminance signal to a pedestal level. Then, the luminance signal from the clamping circuit 2 is supplied to a preemphasizing circuit 3 which preemphasizes high frequency components of the luminance signal.

The preemphasized luminance signal is thereafter supplied to a clipping circuit 4 and clipped thereby. The clipped luminance signal is supplied to a frequency modulator 5 which frequency-modulates the supplied luminance signal. The frequency-modulated luminance signal is supplied to an output terminal 6 from which it is supplied through a high-pass filter (not shown) to an adder (not shown). The adder combines the frequency-modulated luminance signal and a low-frequency-converted carrier chrominance signal from a low-pass filter (not shown). The combined signal is then supplied through an amplifier to a rotary magnetic head by which it is recorded along slanting tracks on a magnetic tape.

The clipping circuit 4 comprises a white clipping circuit 4W and a dark clipping circuit 4D.

The circuit arrangement of the white clipping circuit 4W will first be described below. The output terminal of the preemphasizing circuit 3 is connected to the anode of a clipping diode 13 whose cathode is grounded through a resistor 12. An NPN transistor 11 has an emitter connected to the cathode of the diode 13 and a collector connected to a power supply +B1. The base of the transistor 11 is grounded through a decoupling capacitor 14. The power supply +B1 is grounded through a series-connected circuit of bias resistors 15, 16. The junction between the bias resistors 15, 16 is joined to the base of the transistor 11. The base of the transistor 11 is also connected through a resistor 17 to the collector of an NPN transistor 18 whose emitter is connected to ground. The base of the NPN transistor 18 is connected to a control signal input terminal 19.

The dark clipping circuit 4D has the following circuit arrangement: The output terminal of the preemphasizing circuit 3 is connected to the cathode of a clipping diode 23 whose anode is connected to a power supply +B2 through a resistor 22. A PNP transistor 21 has an emitter connected to the anode of the diode 23 and a collector connected to ground. The base of the transistor 21 is grounded through a decoupling capacitor 24. The power supply +B2 is grounded through a series-connected circuit of bias resistors 25, 26. The junction between the bias resistors 25, 26 is joined to the base of the transistor 21. The base of the transistor 21 is also connected through a resistor 27 to the collector of a PNP transistor 28 whose emitter is connected to the power supply +B2. The base of the PNP transistor 28 is connected to a control signal input terminal 29.

The control signal input terminals 19, 29 of the white and dark clipping circuit 4W, 4D are supplied with low- and high-level control signals, respectively, when a magnetic tape used on the video signal recording apparatus is an evaporated tape, and with high- and low-level control signals, respectively, when the magnetic tape is a metal tape.

If the diodes 13, 23 of the white and dark clipping circuit 4W, 4D comprise transistors of identical characteristics with their collectors and bases directly connected to each other, then the temperature characteristics of the diodes 13, 23 are offset by each other.

Figure 3:
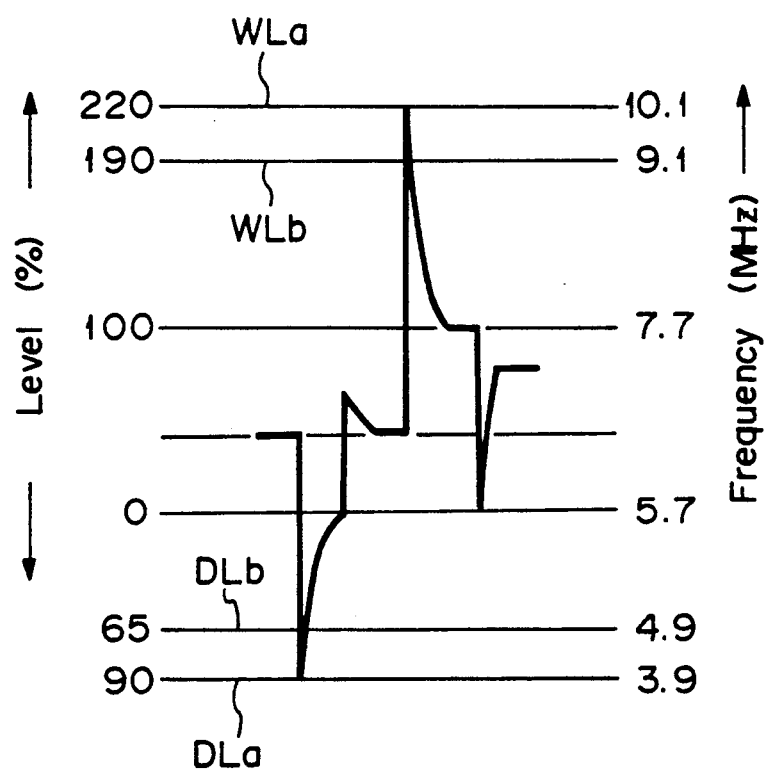
FIG. 3 is a diagram illustrative of clipping levels.

FIG. 3 shows, by way of example, the waveform of a preemphasized luminance signal produced by the preemphasizing circuit 3. FIG. 3 also shows clipping levels (%) with respect to the luminance signal whose high frequency components have been emphasized by the preemphasizing circuit 3, with the level difference between a sync tip and a white peak being 100%. In the high-band 8-mm (Hi 8) video tape recorder, the sync tip level and white peak level of the luminance signal are converted into the frequencies of 5.7 MHz and 7.7 MHz, respectively, by the frequency modulator 5.

When evaporated and metal tapes are used on the video image recording apparatus, respective white clipping levels WLa, WLb of the white clipping circuit 4W with respect to the luminance signal which is frequency-modulated by the frequency modulator 5 are selected to be 220% and 190%, respectively. In order to equalize the respective carrier-to-noise ratios of the electromagnetic transducer of the video signal recording apparatus with respect to the frequency signal components of the frequency-modulated luminance signal. At the same time, respective dark clipping levels DLa, DLb of the dark clipping circuit 4D are also selected to be 90% and 65%, respectively, in symmetric relation to the white clipping levels WLa, WLb, so that the clipped waveforms will not be distorted.

When the luminance signal is frequency-modulated by the frequency modulator 5, the instantaneous frequencies of the frequency-modulated luminance signal corresponding to the white clip level WLa (=220%) the white clip level WLb (=190%), the dark clip level DLa (=90%), and the dark clip level DLb (=65%) are 10.1 MHz, 9.1 MHz, 3.9 MHz, and 4.9 MHZ, respectively.

Figure 1A:
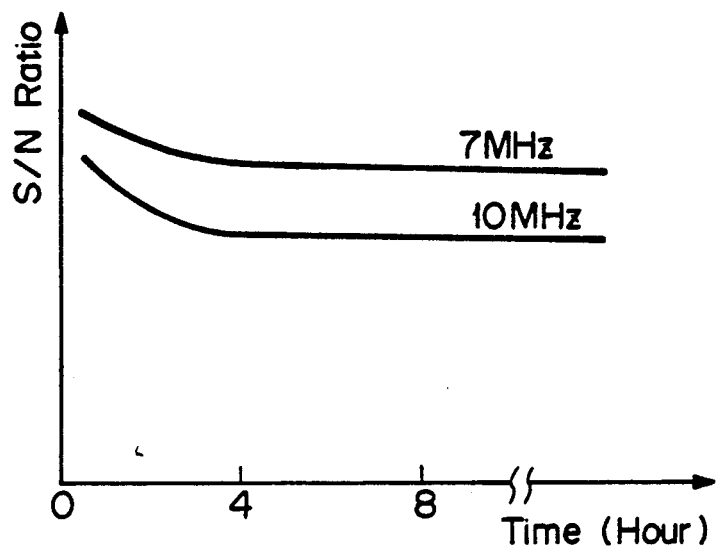
FIGS. 1A and 1B are diagrams showing signal-to-noise ratios, which vary with time, of frequency-modulated luminance signals reproduced from different types of magnetic tapes.
Figure 1B:
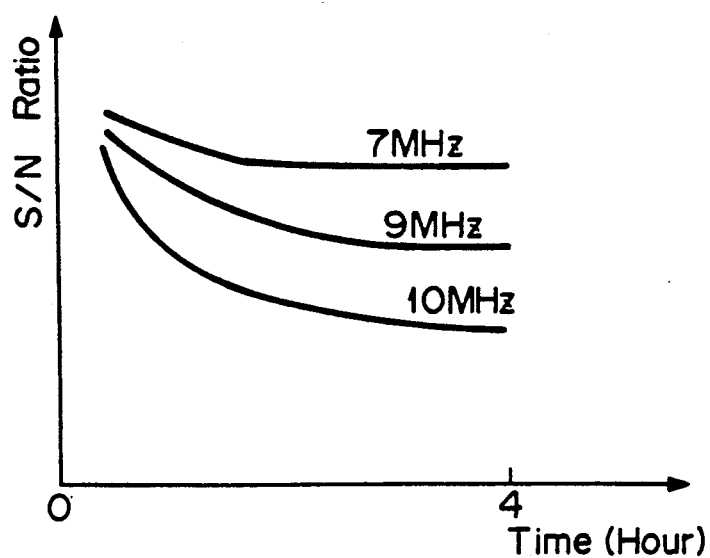

Operation of the video signal recording apparatus thus constructed will be described below with reference to FIGS. 1 and 2.

When the magnetic tape used is an evaporated tape, the low-and high-level control signals are supplied respectively to the control signal input terminals 19, 29 of the white and dark clipping circuits 4W, 4D. Therefore, the transistors 18, 29 are turned off. A clipping voltage corresponding to the white clipping level WLa of 220% is applied to the cathode of the diode 13 of the white clipping circuit 4W. At the same time, a clipping voltage corresponding to the dark clipping level DLa of 90% is applied to the anode of the diode 23 of the dark clipping circuit 4D.

When the magnetic tape used is a metal tape, the high- and low-level control signals are supplied respectively to the control signal input terminals 19, 29 of the white and dark clipping circuit 4W, 4D. Since the transistors 18, 29 are turned on, a clipping voltage corresponding to the white clipping level WLb of 190% is applied to the cathode of the diode 13 of the white clipping circuit 4W, and a clipping voltage corresponding to the dark clipping level DLb of 65% is applied to the anode of the diode 23 of the dark clipping circuit 4D.

The video signal recorded on the magnetic tape is reproduced by a reproducing apparatus (not shown) as follows. The luminance signal reproduced from the magnetic tape by the rotary magnetic head is supplied through an equalizer and a limiter to a frequency demodulator. The frequency demodulator frequency-demodulates the luminance signal and supplies the frequency-demodulated luminance signal to a deemphasizing circuit which reduces the level of high-frequency components of the luminance signal. The chrominance signal reproduced from the magnetic tape by the rotary magnetic head is supplied through a low-pass filter and an automatic color control circuit to a frequency converter. The frequency converter converts low-frequency components of the chrominance signal into high-frequency components, thereby producing an original carrier chrominance signal.

As described above, when the luminance signal is to be recorded on the magnetic tape, the high-frequency components of the luminance signal are increased in level by the preemphasizing circuit 3. However, white spikes of the preemphasized luminance signal are clipped by the white clipping circuit 4W of the clipping circuit 4, and thereafter the luminance signal is frequency-modulated by the frequency modulator 5. Thereafter, reproduced picture images are prevented from being reversed when the frequency-modulated luminance signal reproduced from the magnetic tape is frequency-demodulated.

The clipping circuit 4 can select either one of the white clipping levels, WLb with respect to the frequency-modulated luminance signal depending on the type of the magnetic tape used so that the carrier-to-noise ratios of the electromagnetic transducer will be equalized with respect to the frequency signal components of the frequency-modulated luminance signal. Consequently, picture image reversal margins of the video image recording apparatus with respect to different magnetic tape types are equalized and optimized. Since the dark clipping levels are also changed, the waveform of the recorded luminance signal is not unduly distorted. The carrier-to-noise ratio of the electromagnetic transducer with respect to the frequency signal components of the frequency-modulated luminance signal is good for the evaporated tape. Because of this good carrier-to-noise ratio, when evaporated and metal tapes are used on the video signal recording apparatus, the clipping levels for the luminance signal whose high-frequency components are emphasized may be lowered at the time the luminance signal is recorded, so that a desired video signal can be recorded and reproduced with better waveform reproducibility.

Although a certain preferred embodiment has been shown and described, it should be understood that many changes and modifications may be made therein without departing from the scope of the appended claims.

I claim as my invention:

1. An apparatus for recording a video signal through frequency modulation on a recording medium, comprising:

a preemphasizing circuit means for preemphasizing the video signal;

a clipping circuit means for clipping the preemphasized video signal at a clipping level, said clipping circuit means having means for varying the clipping level depending on a type of the recording medium;

a frequency modulator means for frequency-modulating the clipped preemphasized video signal; and said means for varying comprising a white clipping circuit having a white clipping circuit control signal input and a dark clipping circuit having a dark clipping circuit control signal input, wherein the recording medium types comprise evaporated tape and metal tape, and wherein the for evaporated tape a relatively low level control signal is applied at said white clipping level control signal input and a relatively high control signal is applied to said dark clipping level circuit control input, and for the metal tape, the white clipping level circuit control signal input has a relatively high control signal applied thereto and said dark clipping level control signal input has a relatively low control signal applied thereto.

2. An apparatus for recording a video signal through frequency modulation on a recording medium, comprising:
- a preemphasizing circuit means for preemphasizing the video signal;
- a clipping circuit means for clipping the preemphasized video signal at a clipping level, said clipping circuit means having means for varying the clipping level depending on a type of the recording medium;
- a frequency modulator means for frequency-modulating the clipped preemphasized video signal; and
- said clipping circuit means having at least one control signal input connected to a control signal representative of either an evaporated type tape or a metal type tape.

* * * * *